M. A. STICKLEY.
GATE.
APPLICATION FILED NOV. 11, 1912.
1,075,129.
Patented Oct. 7, 1913.
2 SHEETS—SHEET 1.
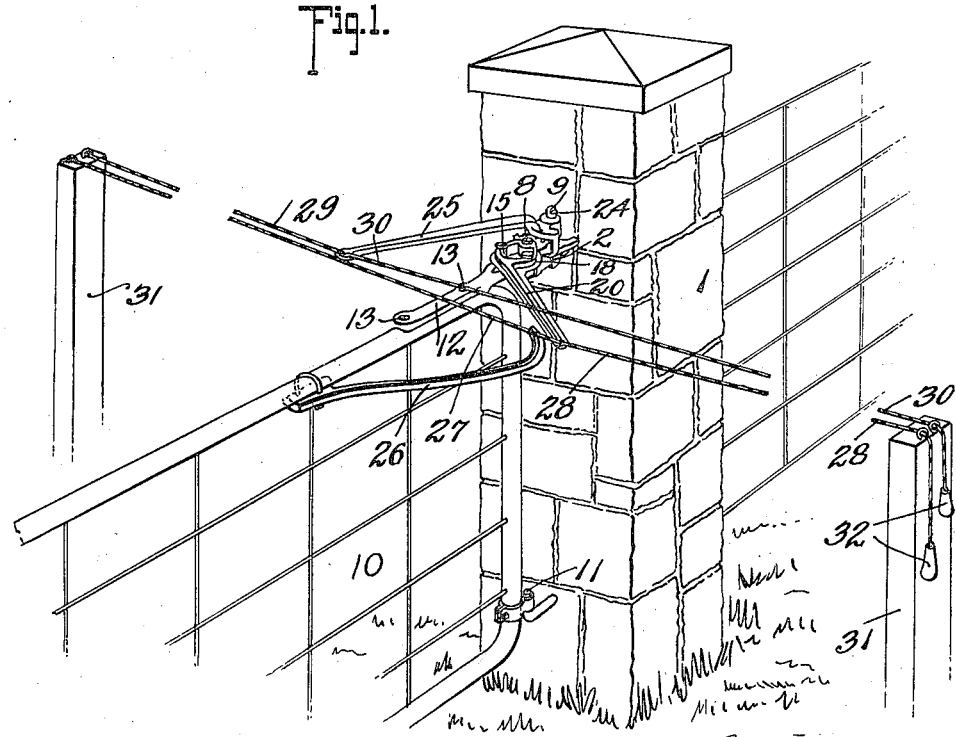
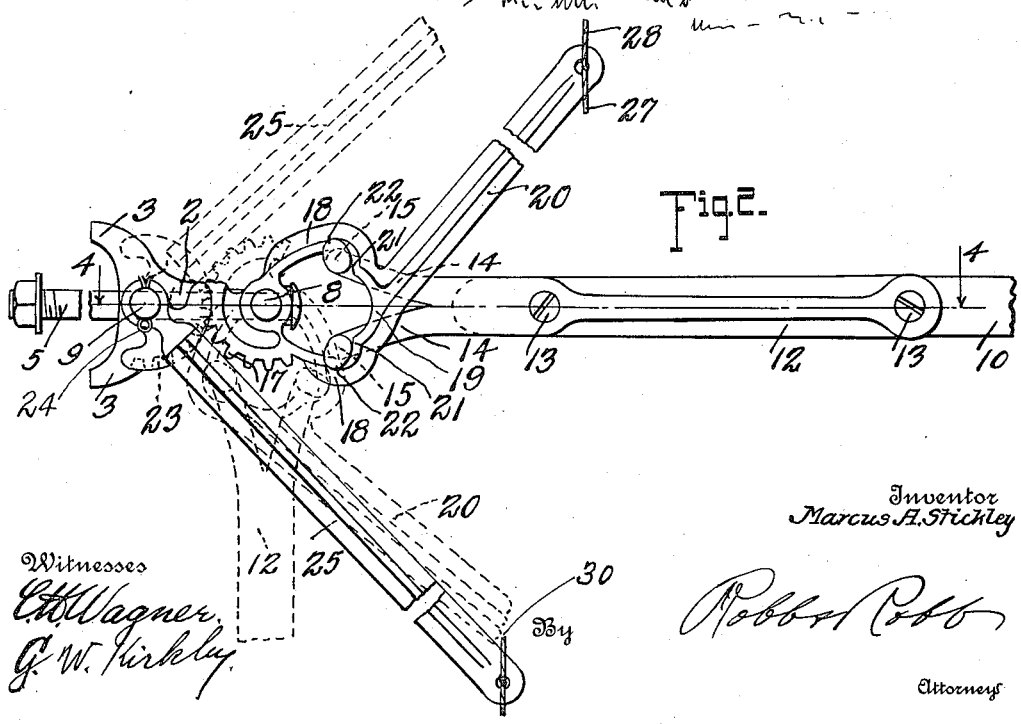
Inventor
Marcus A. Stickley

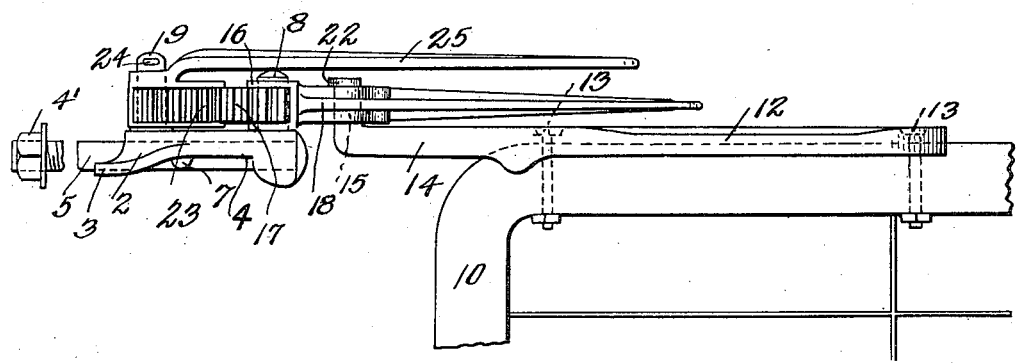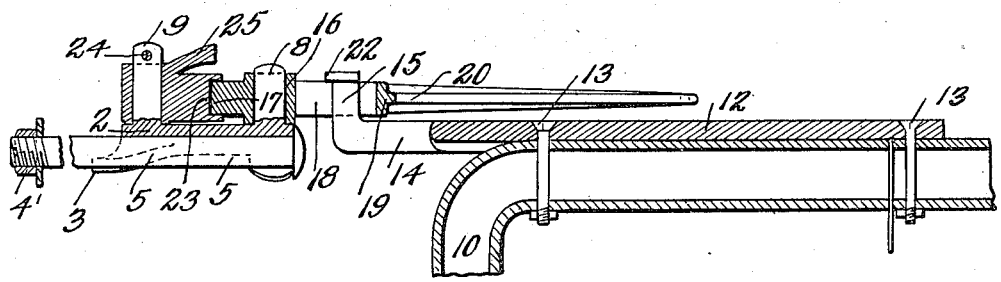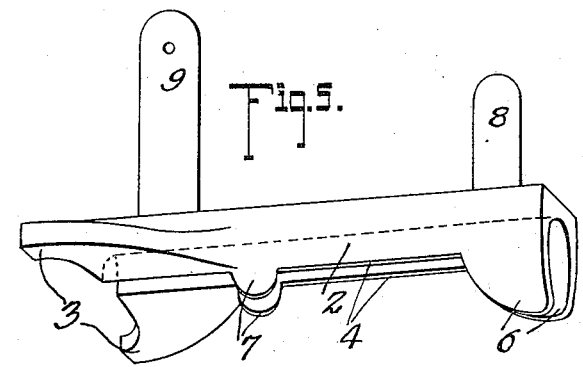

UNITED STATES PATENT OFFICE.

MARCUS A. STICKLEY, OF STRASBURG, VIRGINIA.

GATE.

1,075,129.  Specification of Letters Patent.  Patented Oct. 7, 1913.

Application filed November 11, 1912. Serial No. 730,770.

*To all whom it may concern:*

Be it known that I, MARCUS A. STICKLEY, a citizen of the United States, residing at Strasburg, in the county of Shenandoah and State of Virginia, have invented certain new and useful Improvements in Gates, of which the following is a specification.

This invention relates to improvements in gates, and more particularly to opening and closing devices therefor.

An object in view is the opening and closing of a gate by actuating means disposed all at one side of the support for the gate, and a further object is the adaptability for adjustment of the parts for enabling the opening and closing of the gate in a direction either at one side or at the other of a gateway.

With these and further objects in view, as will in part hereinafter become apparent and in part be stated, the invention comprises gate carried pins spaced apart, cams engaging the pins for tilting the gate to a position off center, intermeshing actuating gears for operating the cams, and means for actuating the gears and cams positioned for being disposed at that side of a gate support at which the gate appears.

The invention also comprises a bearing plate having means of purchase on a support and journals for gearing, gearing mounted on said journals, and means connected therewith for shifting the gate off center for effecting movement to and from a closed position.

The invention further comprises the combination with a gate, of shifting mechanism therefor for tilting the gate off center and effecting pivotal movement thereof, levers extending from said shifting mechanism in the general direction of the gate, and a guard fixed to the gate and outstanding therefrom in position for interrupting approach toward the exposed ends of the levers.

The invention still further comprises certain other novel constructions, combinations and arrangements of parts as will be hereinafter specified and claimed.

In the accompanying drawing: Figure 1 is a perspective view of a gate embodying the features of the present invention. Fig. 2 is a top plan view thereof, parts being broken away. Fig. 3 is a side elevation of the parts seen in Fig. 2. Fig. 4 is a longitudinal, vertical section taken on the plane indicated by line 4—4 of Fig. 2. Fig. 5 is a perspective view of the bearing plate detached and seen on enlarged scale. Fig. 6 is an end view thereof.

Referring to the drawing by numerals, 1 indicates a gate post against which rests one end of a bearing plate 2. The end of plate 2 which engages post 1 is preferably bifurcated forming legs 3, 3 which engage the post at spaced points for increasing the purchase of the plate 2 against the post. The plate 2 may be a casting or otherwise suitably formed and is provided with pendent flanges 4, 4 spaced sufficiently for accommodating therebetween the body of a bolt 5, each flange 4 having at its outer end an extension or lip 6 and adjacent its inner end a similar lip 7 preferably of reduced dimensions, the flanges being bent outwardly from a point adjacent the respective lip 7 and merging into the legs 3. Each of the lips 6 and 7 is curved inwardly to partly surround the bolt 5 forming a support therefor. The bolt 5 extends throughout the length of the plate 2, is provided with a head engaging the inner end of the plate and the pendent flanges and lips 6, and has its body extending beyond the plate 2 through the post or other support 1, the free end of bolt 5 being engaged by a nut 4′ or other suitable retaining means. Upstanding from and formed integral with or otherwise fixed to the plate 2 are journal shafts or rods 8 and 9.

A gate 10 has its lower portion pivotally connected to the post 1, as indicated at 11, and its upper portion, preferably its upper rail, is engaged by a supporting and shifting plate 12. The plate 12 preferably consists of a bar extending longitudinally of the uppermost bar of the gate 10 and bolted thereto as at 13, 13 or otherwise suitably fixed to the gate, the free end of the bar extending beyond the gate and being bifurcated to form arms 14, 14 having upturned ends producing bearing fingers 15, 15 spaced apart at opposite sides of the line of the axis of the gate.

Journaled on the bearing pin or shaft 8 is the shifting or gate actuating member comprising the bearing sleeve 16 from one side of which extends a mutilated spur gear 17 and from an opposite portion of which extend spaced cams 18, 18, each cam 18 forming an arm, which arms are brought together at the terminus of the cams and united as at 19 to form an operating lever, the cam portion of each of said arms extending substantially from the bearing sleeve 16 to a shoulder 21 at the beginning of the contracting or uniting portions 19. The fingers 15 of the respective arms 14 extend preferably from beneath upwardly through the space between the cams 18, and each of said fingers is disposed to engage the respective adjacent cam surface and each is provided with an overhanging projection or lip 22 adapted to effectively retain the fingers against displacement from the cam portions.

A mutilated gear 23 is journaled on the pin or shaft 9 in position for meshing with the teeth of gear 17, the gear 23 being of the shrouded type with the shrouds or protecting side plates disposed to extend upon opposite sides of the teeth of gear 17 so as to effectively prevent lateral movement of the gear 17 and its connected parts. A cotter pin or other suitable retaining means 24 extends through or otherwise engages the upper or free end portion of the pin or shaft 9 for retaining the gear 23 against lateral movement. Formed integrally with or suitably fixed to the gear 23 is an operating lever 25 which preferably extends from the point of engagement with the gear substantially radially approximately midway of the length of the toothed portion of the gear.

The levers 20 and 25 are disposed to project in the general direction of the gate 10, that is in the direction away from the post 1, so that the gate actuating means set forth may be readily applied to a post extending above the level of the gate, and to avoid danger of accidentally operating the parts while the gate is open, or causing injury by impact by striking against either of the levers 20 or 25, a guard rail or bar 26 is provided, the said bar being fixed at its outer end to the gate 10 at a point spaced from the pivoted end of the gate and extending thence inwardly on a curved line in position for having its curved portion project beyond the free ends of the levers 20 and 25 when the gate is open, so as to effectively serve as a guard.

Each lever 20 and 25 is formed at its outer end with an aperture or other cable receiving means and lever 20 is engaged by cables 27 and 28 extending in opposite directions. Lever 25 is engaged by similar cables 29 and 30, the cables 27 and 29 extending in the same general direction to one side of the gate 10 and the cables 28 and 30 extending in the opposite direction to the opposite side of the gate 10, each of said cables having its outer portion preferably supported and guided by suitable guiding means sustained by posts 31 spaced from the post 1 a distance preferably somewhat greater than the length of the gate. The posts 31 are preferably spaced from post 1 a sufficient distance to enable the operator, while remaining seated in a vehicle, to grasp the terminal of the proper cable and actuate the same for opening the gate, without the necessity for dismounting. Each of the cables 27, 28, 29 and 30 may have its outer terminal supplied with a counterbalance weight 32 for assisting in or relieving the strain of manipulating the gate.

In operation, the parts being in the position seen in Fig. 2, the lever 20 has its free end moved in the direction toward the gate, whereby the shoulder 21 at the opposite side of the gate from that occupied by lever 20, by its engagement with its respective finger 15, forces the finger rearwardly to the position indicated in dotted lines, during which movement the other finger 15 is caused to travel along its respective cam 18 until arriving at the inner terminus of the cam, at which point the lever 20 will have reached the limit of its movement and the gate 10 will have been shifted off center a distance sufficient to cause the same to swing open, the movement of the gate in opening being in a direction causing the finger 15 which has been moved to the inner terminus of its cam 18 to travel along said cam to the outer terminus thereof, that is to a position against the respective shoulder 21. In other words, the gate 10 swings open in the same direction as the direction of movement of lever 20 and continues its swing until the fingers 15 have assumed their normal position relative to the cams 18. This movement of the lever 20, as will be apparent, will have caused a relatively opposite compensating movement of the lever 25 by the action of the intermeshing of the gears 17 and 23. This operation is presumed to have been accomplished by one pulling upon the cable 27 and after passing through the gateway the operator restores the gate to its closed position by pulling upon the cable 28, whereby the finger 15 which was formerly bodily moved by the contact of the shoulder 21 is slid inwardly to the inner terminus of its cam 18, while the other finger 15 is engaged by its shoulder and forced bodily to the position resulting in the tilted or off centered relation of the gate which causes the gate to swing to its closed position. If the operator approaches from the other direction the operation will be the same except that the operator grasps the cable 30 and swings the lever 25 toward the gate thus tilting the same by the actuation of the intermeshing gears and the resultant action of the shoulders and cams on the fingers 15, and after passing through the gateway the operator pulls the cable 29 and restores the parts, as above set forth. It is to be noted that the angular relation of the levers 25 affords maximum leverage movement, and the employment of a plurality of levers enables the actuation of the gate always in the same direction when opening. It is further to be observed that the gate shifting member comprised of the gear 17 and connected parts is exactly the same on both faces so that the said member may be inverted and when applied in the inverted position with the lever 25 swung to the opposite side of the gate from that illustrated in Fig. 2, the gate may be opened only in the opposite direction from that in which it is adapted to be opened with the parts in the position shown in Fig. 2.

Having thus described the invention, what is claimed is:

1. In a gate structure, the combination of a bearing plate adapted to have one end engage a support, said bearing plate comprising a body and pendent flanges, a bolt extending between the flanges and having a head engaging the ends thereof, said bolt being adapted to be extended through the support engaged by the bearing plate, and gate actuating means journaled on the bearing plate.

2. In a gate structure, the combination of a bearing plate adapted to have one end engage a support, said bearing plate comprising a body having pendent flanges and lips depending from the flanges and bent toward each other, a bolt extending between the flanges and dimensioned to be retained against dislocation from between the flanges by engagement with said lips, the said bolt being adapted to extend beyond the bearing plate and into supporting engagement with the support engaged by the bearing plate, and gate actuating means journaled on the bearing plate.

3. In a gate structure, the combination of a bearing plate, supporting means therefor, journal pins extending from the bearing plate, intermeshing gears journaled on said pins, a lever for each of said gears, each lever being connected with its respective gear for actuating the same, and gate shifting means disposed between one of the levers and its gear and connected with the lever and gear for being actuated thereby.

4. In a gate structure, the combination, with a pivotally mounted gate, of intermeshing gears journaled adjacent the gate, a lever connected to each of the gears, one of the levers being disposed to extend in the direction toward one side of the gate and the other lever being disposed to extend toward the other side of the gate when the gate is closed, and gate actuating means disposed between one of the levers and its gear and connected to be operated by said levers and gears.

5. In a gate structure, the combination, with a pivotally mounted gate, of intermeshing gears journaled adjacent the gate, a lever connected to each of the gears, one of the levers being disposed to extend in a direction toward one side of the gate and the other lever being disposed to extend toward the other side of the gate when the gate is closed, and gate actuating means connected to be operated by said gears, one of the gears being adapted to be inverted for disposing its respective lever at the relatively opposite side of the gate and the other gear being adapted to be swung for positioning its lever at the side of the gate opposite that formerly occupied by said last mentioned lever.

6. In a gate structure, the combination of a bearing plate, intermeshing gears journaled thereon, one of said gears being adapted to be inverted and the other of said gears being shrouded to retain the first mentioned gear against dislocation, means retaining the shrouded gear against dislocation, a lever connected with each of the gears, one of said levers being adapted to project at an angle to the other relative to a closed position of the gate, and gate actuating means engaging and adapted to be operated by one of the gears.

7. In a gate structure, the combination, with supporting means, of intermeshing gears journaled thereon, cams connected with one of said gears and spaced apart, a shoulder being formed at the terminus of each cam, a plate adapted to be fixed to a gate and bifurcated at one end, the arms of the bifurcation being formed with fingers disposed to extend between the cams and each to engage a respective cam, each of said fingers being formed with an overhanging projection adapted to engage the corresponding adjacent cam for guiding the finger in its movement along the cam, and means for actuating said gears.

8. In a gate structure, the combination of means for shifting a gate, a lever for actuating said gate shifting means disposed to extend at one side of and in a general direction along the gate and at times adapted to assume a position extending into the gateway, and a gate carried guard rail curved to dispose a curved portion outside of said lever.

9. In a gate structure, the combination, with a support and a gate pivotally connected thereto, of means for shifting the gate, intermeshing gears connected to actuate the shifting means, levers connected with the gears for actuating the same, said levers extending in the general direction toward the gate away from the support, and a guard arm fixed to the gate and curved to extend in a curved path adjacent the levers when the gate is in its open position.

In testimony whereof I affix my signature in presence of two witnesses.

MARCUS A. STICKLEY.

Witnesses:
B. F. RICHARD,
L. O. STICKLEY.

Copies of this patent may be obtained for five cents each, by addressing the "Commissioner of Patents, Washington, D. C."